United States Patent
Wu

(10) Patent No.: US 8,897,127 B2
(45) Date of Patent: Nov. 25, 2014

(54) ADMISSION METHOD, ADMISSION APPARATUS AND COMMUNICATION SYSTEM

(75) Inventor: Peng Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 921 days.

(21) Appl. No.: 12/954,469

(22) Filed: Nov. 24, 2010

(65) Prior Publication Data

US 2011/0128845 A1    Jun. 2, 2011

(30) Foreign Application Priority Data

Nov. 27, 2009   (CN) .......................... 2009 1 0199795

(51) Int. Cl.
| | |
|---|---|
| *H04L 12/26* | (2006.01) |
| *H04W 72/04* | (2009.01) |
| *H04L 12/911* | (2013.01) |
| *H04L 12/927* | (2013.01) |
| *H04W 72/08* | (2009.01) |
| *H04W 74/00* | (2009.01) |

(52) U.S. Cl.
CPC .......... *H04W 72/0486* (2013.01); *H04L 47/70* (2013.01); *H04L 47/80* (2013.01); *H04W 72/08* (2013.01); *H04W 74/00* (2013.01)
USPC ........................... 370/230; 455/515; 709/225

(58) Field of Classification Search
None
See application file for complete search history.

(56) References Cited

U.S. PATENT DOCUMENTS

| | | | | |
|---|---|---|---|---|
| 2005/0059417 | A1* | 3/2005 | Zhang et al. .................. | 455/515 |
| 2005/0083842 | A1* | 4/2005 | Yang et al. .................... | 370/230 |
| 2007/0110000 | A1* | 5/2007 | Abedi ........................... | 370/332 |

* cited by examiner

Primary Examiner — Khoa Huynh

(57) ABSTRACT

An admission method, an admission apparatus, and a communication system are disclosed. The admission method includes: obtaining timeslot utilization efficiency R1 of a first User Equipment (UE) that needs to access a system and timeslot utilization efficiency R2 of a second UE that has accessed the system; judging whether the difference between R1 and R2 is greater than a first decision threshold; and allowing the first UE to access the system if determining that the difference between R1 and R2 is greater than the first decision threshold. The admission method provided herein is applicable to a communication system, and can improve the timeslot utilization efficiency and the throughput of the system.

14 Claims, 5 Drawing Sheets

ADMISSION METHOD, ADMISSION APPARATUS AND COMMUNICATION SYSTEM

CROSS-REFERENCE TO RELATED APPLICATION

This application claims priority to Chinese Patent Application No. 200910199795.2, filed on Nov. 27, 2009, which is hereby incorporated by reference in its entirety.

TECHNICAL FIELD

The present invention relates to mobile communication technologies, and in particular, to an admission method, an admission apparatus, and a communication system.

BACKGROUND

In the running process of a communication system, the load on the communication system changes due to some factors, for example, the connection of new calls, data stream activation, or change of the wireless environment. If the load on the carrier of the communication system increases to a certain extent, the Quality of Service (QoS) will be reduced, especially the QoS of the low-priority services. In this case, a certain load control measure needs to be taken, for example, reducing the QoS of a User Equipment (UE) in a low-quality wireless environment, or performing forward admission. In this way, the load on the carrier of the communication system is reduced, and the running stability of the communication system is ensured.

The admission method in the prior art primarily exercises control on the total number of timeslots of the communication system. However, after the UE in a low-quality wireless environment accesses the system, the timeslot occupancy ratio of the UE is high, and the total timeslot occupancy ratio of the communication system approaches the threshold, which makes the UE in a high-quality wireless environment unable to access the communication system and reduces the timeslot utilization efficiency of the communication system.

SUMMARY

The embodiments of the present invention provide an admission method, an admission apparatus, and a communication system to improve the timeslot utilization efficiency and the throughput of the system.

An admission method provided in an embodiment of the present invention includes: making an admission decision according to timeslot utilization efficiency. More specifically, the admission method includes:

obtaining timeslot utilization efficiency R1 of a first UE that needs to access a system and timeslot utilization efficiency R2 of a second UE that has accessed the system;

judging whether the difference between R1 and R2 is greater than a first decision threshold; and allowing the first UE to access the system if determining that the difference between R1 and R2 is greater than the first decision threshold.

An admission apparatus provided in an embodiment of the present invention includes:

a first obtaining unit, configured to obtain timeslot utilization efficiency R1 of a first UE that needs to access a system and timeslot utilization efficiency R2 of a UE that has accessed the system;

a first judging unit, configured to judge whether the difference between R1 and R2 is greater than a first decision threshold; and an admission control unit, configured to allow the first UE to access the system if the first judging unit determines that the difference between R1 and R2 is greater than the first decision threshold.

A communication system provided in an embodiment of the present invention includes the admission apparatus described above.

In the embodiments of the present invention, an admission decision is made according to whether the difference between the timeslot utilization efficiency of the first UE that needs to access the system and the timeslot utilization efficiency of the UE that has accessed the system is greater than the first decision threshold. Compared with the prior art, the embodiments of the present invention enable the UE with high timeslot utilization efficiency to access the system, thus improving the timeslot utilization efficiency and the throughput of the system.

BRIEF DESCRIPTION OF THE DRAWINGS

To describe the technical solution under the present invention more clearly, the following outlines the accompanying drawings involved in the embodiments of the present invention. Apparently, the accompanying drawings outlined below are not exhaustive, and persons of ordinary skill in the art can derive other drawings from such accompanying drawings without any creative effort.

DETAILED DESCRIPTION

The embodiments of the present invention provide an admission method, an admission apparatus, and a communication system. To make the technical solution under the present invention clearer, the following describes the embodiments of the present invention in more detail with reference to accompanying drawings.

Figure 1:
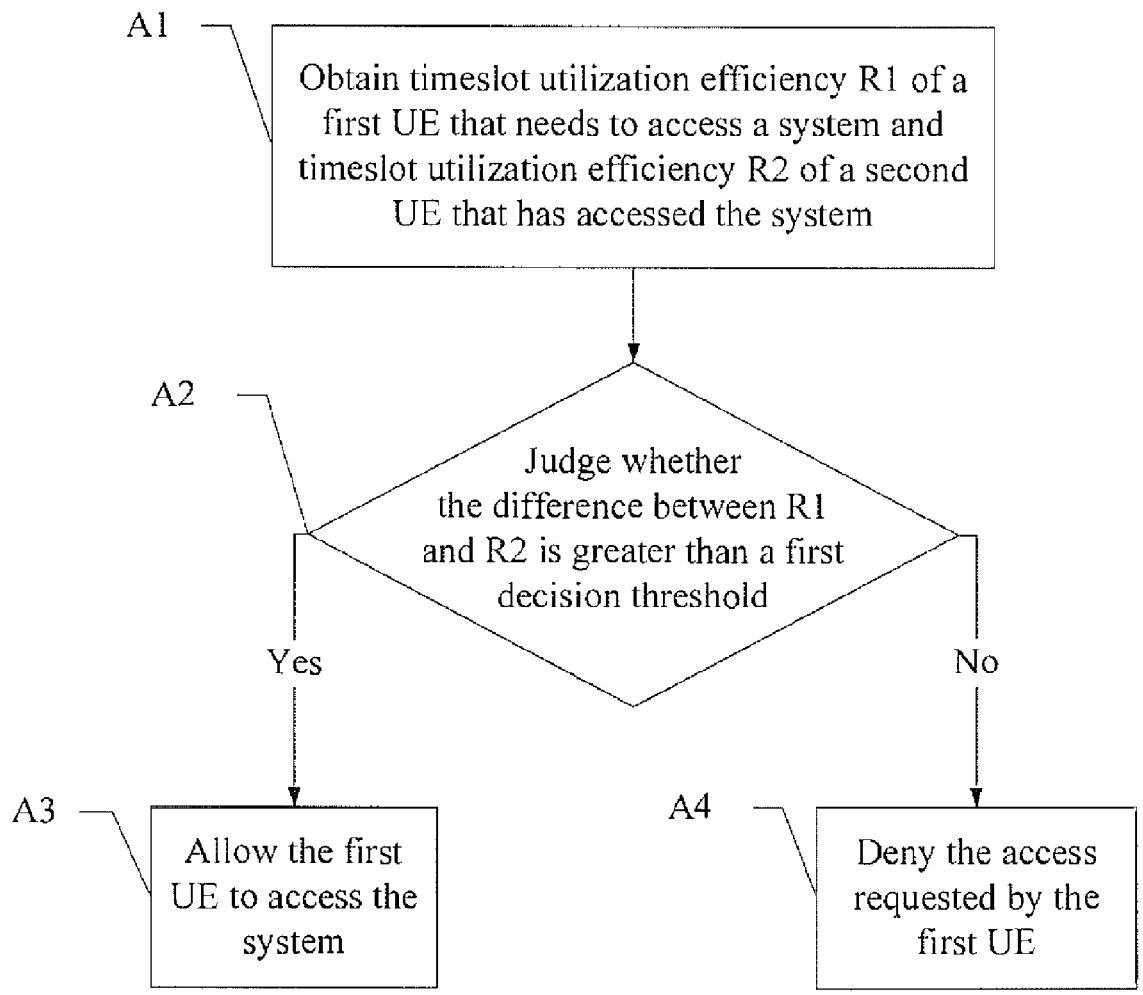
FIG. 1 is a flowchart of an admission method provided in the first embodiment of the present invention.

FIG. 1 is a flowchart of an admission method provided in the first embodiment of the present invention. In a communication system, forward admission for the UE is triggered by the connection of new calls, increase of data links of soft handover, data stream activation, and other occasions that involve allocation of timeslot resources to the UE. The communication system mentioned herein refers to but is not limited to: Wideband Code Division Multiple Access (WCDMA) system, Global System for Mobile Communications (GSM), Time Division-Synchronous Code Division Multiple Access (TD-SCDMA) system, Code Division Multiple Access (CDMA) system, Worldwide Interoperability for Microwave Access (WiMAX) system, and Long Term Evolution (LTE) system.

In this embodiment, the admission method may include the following steps:

A1. Obtain timeslot utilization efficiency R1 of a first UE that needs to access a system and timeslot utilization efficiency R2 of a second UE that has accessed the system.

Specifically, in this embodiment, the timeslot utilization efficiency R1 of the first UE that needs to access the system and the timeslot utilization efficiency R2 of the second UE that has accessed the system can be obtained.

The mode of obtaining the timeslot utilization efficiency R1 of the first UE that needs to access the system may be: calculating the timeslot utilization efficiency of the first UE according to the data rate requested by the first UE from the system and the number of timeslots occupied by the first UE; or calculating the timeslot utilization efficiency of the first UE according to a data rate of air interface Data Rate Control (DRC) of the first UE and a maximum data rate of the air interface DRC.

A2. Judge whether the difference between R1 and R2 is greater than or equal to a first decision threshold.

Specifically, the first decision threshold may be set flexibly according to the total timeslot utilization efficiency of the communication system.

If the difference between R1 and R2 is greater than or equal to the first decision threshold, the procedure proceeds to step A3; otherwise, the procedure proceeds to step A4.

A3. Allow the first UE to access the system.

Specifically, if it is determined that the difference between R1 and R2 is greater than or equal to the first decision threshold, the timeslot utilization efficiency of the first UE is relatively high, and the first UE is allowed to access the system.

A4. Deny the access requested by the first UE.

Specifically, if it is determined that the difference between R1 and R2 is less than the first decision threshold, the timeslot utilization efficiency of the first UE is relatively low, and the first UE is not allowed to access the system.

In this embodiment, an admission decision is made according to whether the difference between the timeslot utilization efficiency of the first UE that needs to access the system and the timeslot utilization efficiency of the second UE that has accessed the system is greater than the first decision threshold. Compared with the prior art, this embodiment enables the UE with high timeslot utilization efficiency to access the system, thus improving the timeslot utilization efficiency and the throughput of the system.

In this embodiment, the minimum value of the timeslot utilization efficiency of the UE that has accessed the system can be obtained, namely, the second UE may be the UE with the lowest timeslot utilization efficiency among the UEs that have accessed the system. In this case, a judgment is made about whether the difference between the timeslot utilization efficiency (R1) of the first UE and the minimum timeslot utilization efficiency (for example, R2) of the UE that has accessed the system is greater than the first decision threshold. Compared with the prior art, this embodiment of the present invention enables the UE with high timeslot utilization efficiency to access the system more accurately, thus improving the timeslot utilization efficiency and the throughput of the communication system.

Figure 2:
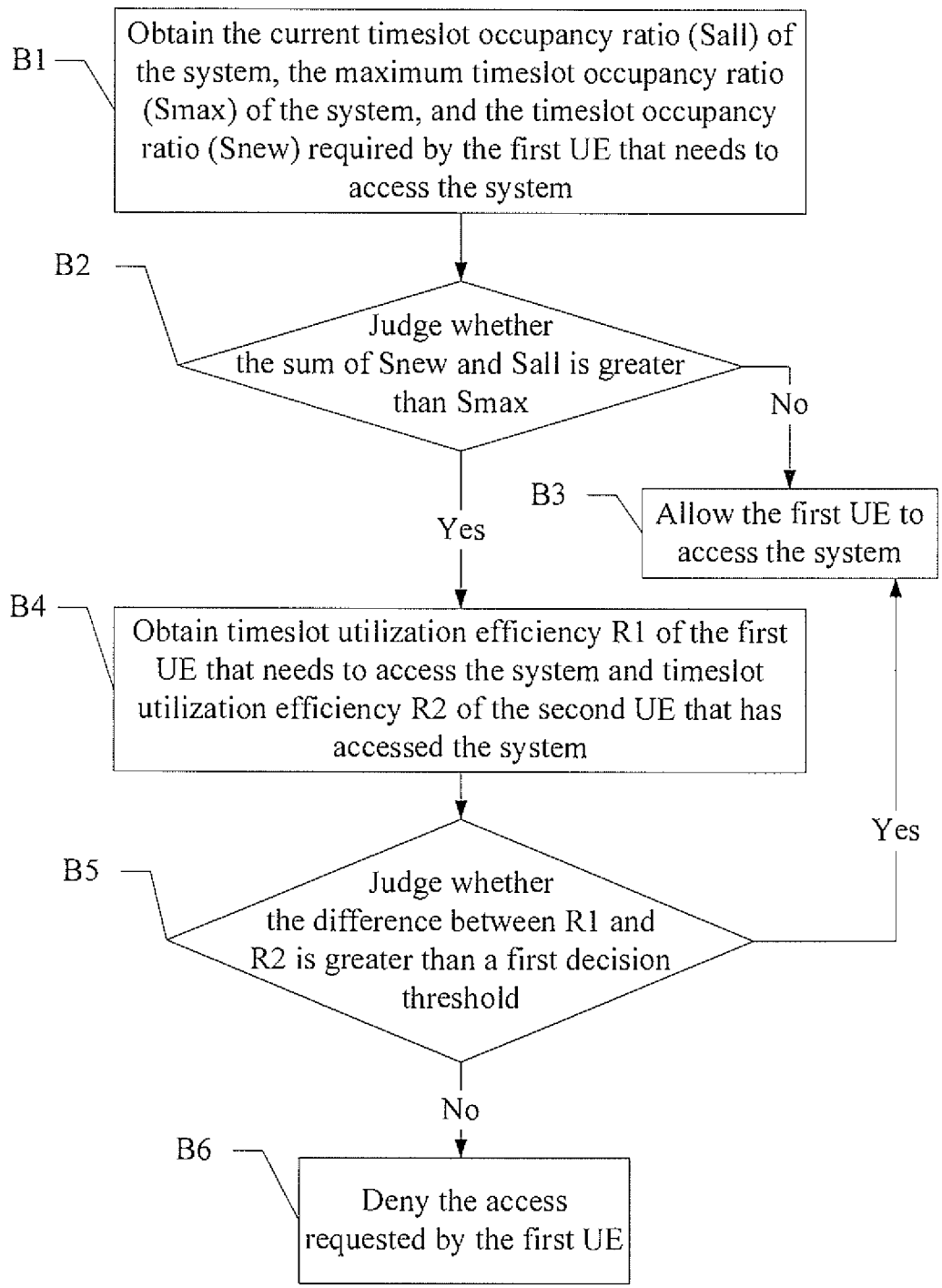
FIG. 2 is a flowchart of an admission method provided in the second embodiment of the present invention.

FIG. 2 is a flowchart of an admission method provided in the second embodiment of the present invention. In the second embodiment of the present invention, the admission decision takes account of the timeslot occupancy ratio. The admission method in the second embodiment may include the following steps:

B1. Obtain the current timeslot occupancy ratio ($S_{all}$) of the system, the maximum timeslot occupancy ratio ($S_{max}$) of the system, and the timeslot occupancy ratio ($S_{new}$) required by a first UE that needs to access the system.

Specifically, in this embodiment, the following timeslot occupancy ratios can be obtained: the current timeslot occupancy ratio ($S_{all}$) of the system, the maximum timeslot occupancy ratio ($S_{max}$) of the system, and the timeslot occupancy ratio ($S_{new}$) required by the first UE that needs to access the system.

B2. Judge whether the sum of $S_{new}$ and $S_{all}$ is greater than $S_{max}$.

Specifically, in this embodiment, a judgment may be made about whether the sum of $S_{new}$ and $S_{all}$ is greater than $S_{max}$. If the sum of $S_{new}$ and $S_{all}$ is greater than $S_{max}$, step B4 is triggered to make an admission decision according to the timeslot utilization efficiency.

Specifically, if the sum of $S_{new}$ and $S_{all}$ is less than or equal to $S_{max}$, step B3 is triggered.

B3. Allow the first UE to access the system.

Specifically, if the sum of $S_{new}$ and $S_{all}$ is less than or equal to $S_{max}$, the timeslot occupancy ratio of the system is suitable for the first UE to access the system, and the first UE is allowed to access the system.

B4. Obtain timeslot utilization efficiency R1 of the first UE that needs to access the system and timeslot utilization efficiency R2 of the second UE that has accessed the system.

B5. Judge whether the difference between R1 and R2 is greater than or equal to a first decision threshold.

Specifically, the first decision threshold may be set flexibly according to the total timeslot utilization efficiency of the communication system. If the difference between R1 and R2 is greater than or equal to the first decision threshold, the procedure proceeds to step B3; otherwise, the procedure proceeds to step B6.

B6. Deny the access requested by the first UE.

Specifically, if the difference between R1 and R2 is less than the first decision threshold, the timeslot utilization efficiency of the first UE is relatively low, and the first UE is not allowed to access the system.

In this embodiment, the admission decision is based on the timeslot occupancy ratio additionally. Therefore, when the system resources are enough, the first UE can access the system even if the timeslot utilization efficiency of the first UE is low. Besides, in this embodiment, the first UE can still access the system when the system resources are not enough but the timeslot utilization efficiency of the first UE is high, thereby avoiding the denial of the access of the UE whose timeslot utilization efficiency is high. Compared with the prior art, this embodiment enables the UE to access the system more flexibly, and enables the UE with high timeslot utilization efficiency to access the system, thus improving the timeslot utilization efficiency and the throughput of the system.

Figure 3:
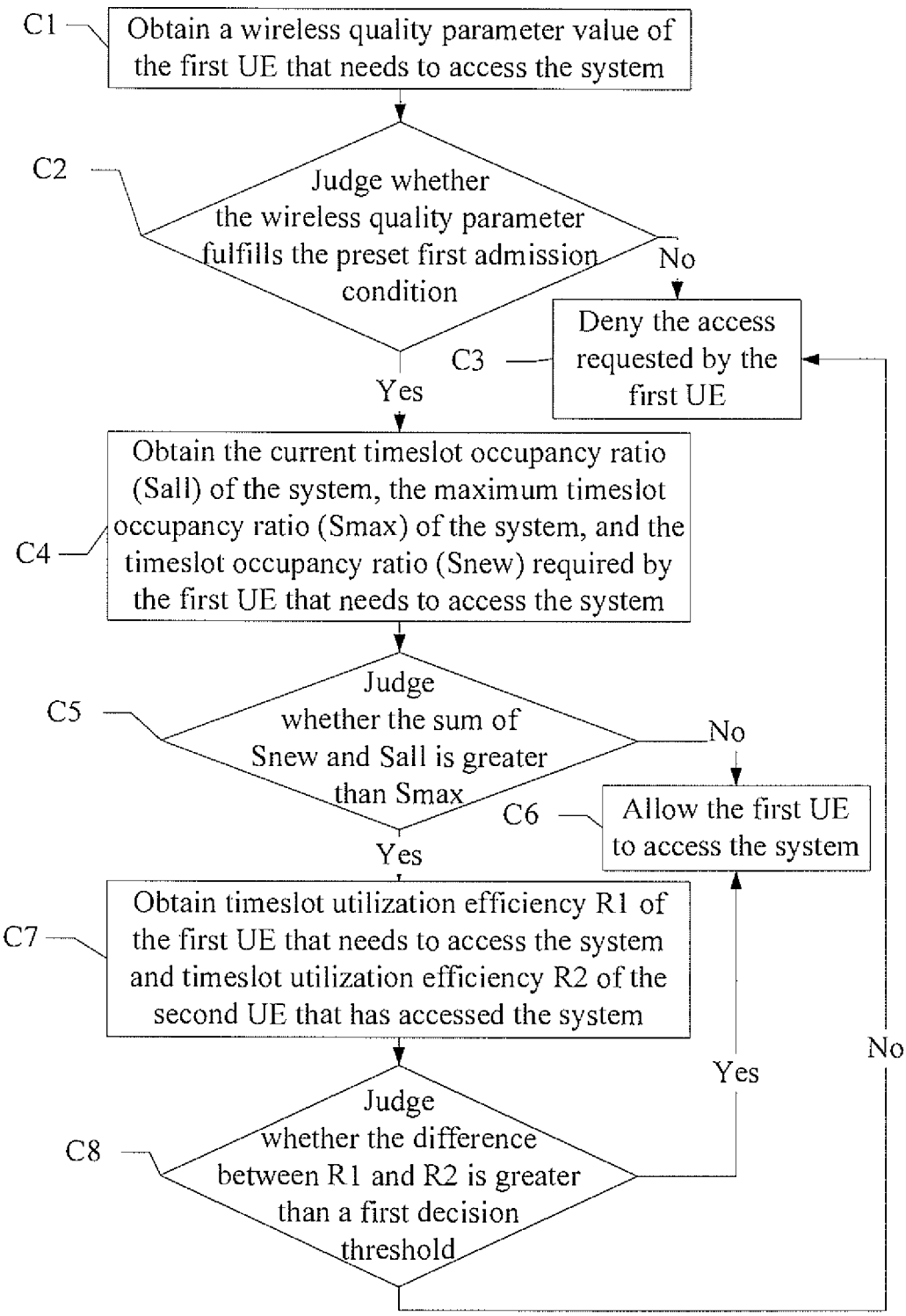
FIG. 3 is a flowchart of an admission method provided in the third embodiment of the present invention.

FIG. 3 is a flowchart of an admission method provided in the third embodiment of the present invention. In the third embodiment of the admission method, the admission decision may take account of the wireless quality parameter of the UE. The admission method in the third embodiment may include the following steps:

C1. Obtain the wireless quality parameter value of the first UE that needs to access the system.

Specifically, in this embodiment, the wireless quality parameter value such as DRC and Carrier-to-Interference Ratio (CIR) of the first UE that needs to access the system can be obtained.

C2. Judge whether the wireless quality parameter fulfills the preset first admission condition.

The first admission condition maybe set flexibly according to different wireless quality parameters and system types.

If it is determined that the wireless quality parameter fulfills the preset first admission condition, the network environment of the first UE is good, and step C4 is triggered to make an admission decision for the first UE according to the timeslot occupancy ratio. If it is determined that the wireless quality parameter does not fulfill the preset first admission condition, the network environment of the first UE is poor, and step C3 is triggered.

C3. Deny the access requested by the first UE.

C4. Obtain the current timeslot occupancy ratio ($S_{all}$) of the system, the maximum timeslot occupancy ratio ($S_{max}$) of the system, and the timeslot occupancy ratio ($S_{new}$) required by the first UE that needs to access the system.

C5. Judge whether the sum of $S_{new}$ and $S_{all}$ is greater than $S_{max}$.

Specifically, in this embodiment, a judgment may be made about whether the sum of $S_{new}$ and $S_{all}$ is greater than $S_{max}$. If the sum of $S_{new}$ and $S_{all}$ is greater than $S_{max}$, step C7 is triggerd to make an admission decision according to the timeslot utilization efficiency.

Specifically, if the sum of $S_{new}$ and $S_{all}$ is less than or equal to $S_{max}$, step C6 is triggered.

C6. Allow the first UE to access the system.

Specifically, if the sum of $S_{new}$ and $S_{all}$ is less than or equal to $S_{max}$, the timeslot occupancy ratio of the system is suitable for the first UE to access the system, and the first UE is allowed to access the system.

C7. Obtain timeslot utilization efficiency R1 of the first UE that needs to access the system and timeslot utilization efficiency R2 of the second UE that has accessed the system.

C8. Judge whether the difference between R1 and R2 is greater than or equal to a first decision threshold.

Specifically, the first decision threshold may be set flexibly according to the total timeslot utilization efficiency of the communication system. If the difference between R1 and R2 is greater than or equal to the first decision threshold, the procedure proceeds to step C6; otherwise, the timeslot utilization efficiency of the first UE is low, and the procedure proceeds to step C3.

In this embodiment, the admission decision is based on the wireless quality parameter of the first UE additionally, thus preventing the UE with low wireless quality from accessing the system, and preventing the UE from occupying excessive timeslot resources after the access. Therefore, this embodiment improves the resource utilization efficiency and the throughput of the system.

Besides, in this embodiment, if the wireless quality parameter is a DRC value, an admission apparatus may judge whether the DRC value "D1" of the first UE is greater than the preset DRC admission threshold. If the DRC value "D1" of the first UE is greater than the preset DRC admission threshold, the procedure proceeds to step C4 to make an admission decision according to the timeslot occupancy ratio; if not, the procedure proceeds to step C3 to deny the access requested by the first UE.

If the wireless quality parameter is a CIR, the admission apparatus may judge whether the CIR "P1" of the first UE is greater than the preset CIR admission threshold. If the CIR "P1" of the first UE is greater than the preset CIR admission threshold, the procedure proceeds to step C4 to make an admission decision according to the timeslot occupancy ratio; if not, the procedure proceeds to step C3 to deny the access requested by the first UE.

If the wireless quality parameter is a receiving level, the admission apparatus may judge whether the receiving level "L1" of the first UE is less than the preset receiving level admission threshold. If the receiving level "L1" of the first UE is less than the preset receiving level admission threshold, the procedure proceeds to step C4 to make an admission decision according to the timeslot occupancy ratio; if not, the procedure proceeds to step C3 to deny the access requested by the first UE. The wireless quality parameters are not limited to the DRC, CIR, and receiving level, and may be other parameters. If the wireless quality parameter is another parameter, the first admission condition changes accordingly.

To make the present invention clearer, the following describes the admission method under the present invention through a specific application scenario.

In this application scenario, UE1 is currently online; the air interface DRC of UE1 is equal to 4, namely, the data rate of the air interface DRC of UE1 is 307.2 Kbps, the requested data rate is 110 Kbps, and the number of timeslots actually occupied by UE1 is 220. A Video Telephone (VT) service will be initiated by UE2 and UE3. The air interface DRC requested by UE2 is 1, namely, the data rate of the air interface DRC is 38.4 Kbps, and the requested data rate is 110 Kbps. The air interface DRC requested by UE3 is 12, the requested data rate is 110 Kbps, and the number of timeslots actually occupied by UE3 is 35. In this application scenario, the wireless quality parameter is DRC, and the corresponding first admission condition is that the DRC is greater than 3. The wireless quality parameter may also be another parameter, for example, CIR or receiving level of UE2 and UE3. In this case, the first admission condition changes accordingly.

Figure 4:
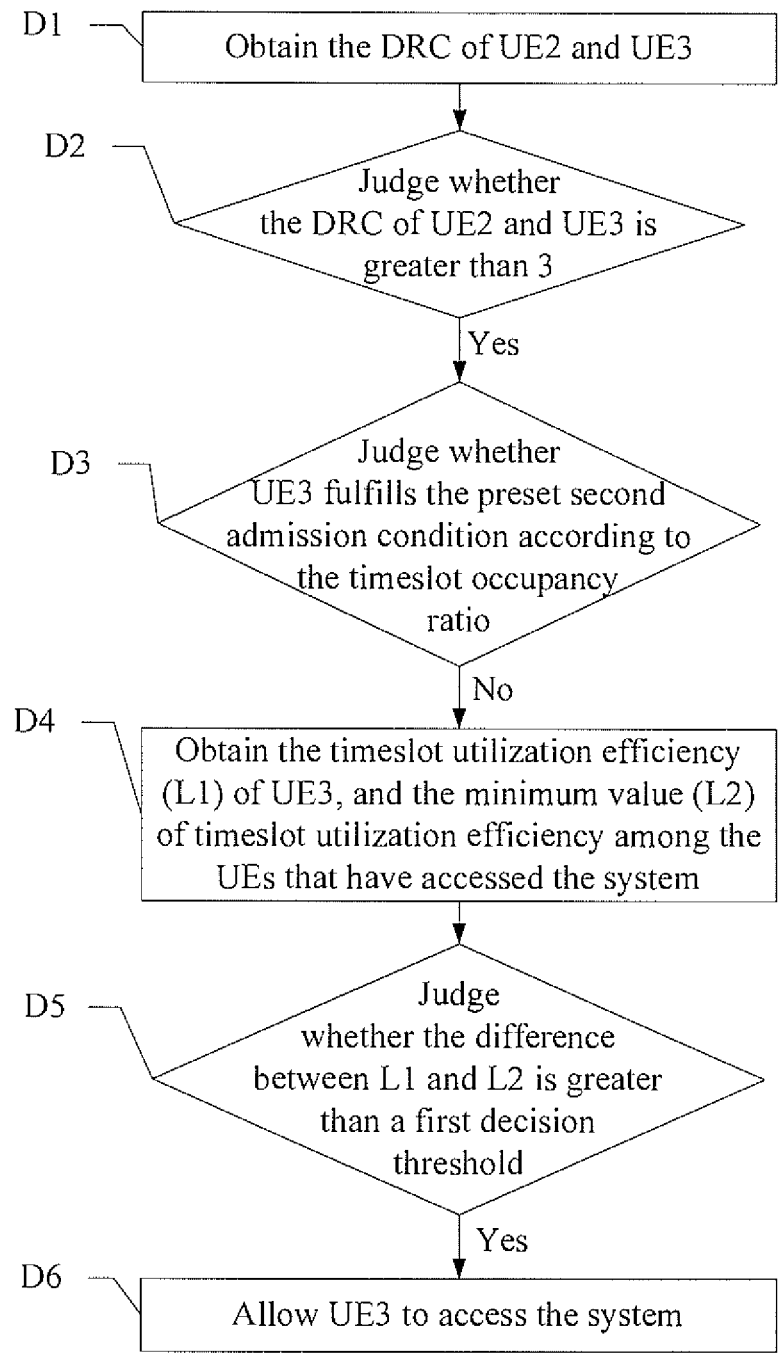
FIG. 4 is a flowchart of an admission method provided in the fourth embodiment of the present invention.

FIG. 4 is a flowchart of an admission method provided in the fourth embodiment of the present invention. In this embodiment, the network starts to make the admission decision upon receiving the request from UE2 and UE3. The admission decision includes the following steps:

D1. Obtain the DRC of UE2 and UE3.

Specifically, in this embodiment, the DRC of UE2 and UE3 can be obtained, and the DRC of UE1, UE2, and UE3 is 4, 1 and 12 respectively.

D1. Judge whether the DRC of UE2 and UE3 is greater than 3.

Specifically, in this embodiment, it is judged whether the DRC of UE2 and UE3 is greater than 3; when it is determined that the DRC of UE2 is less than 3, the access requested by UE2 is denied by the network; when it is determined the DRC of UE3 is greater than 3, the admission decision procedure proceeds to step D3.

D3. Judge whether UE3 fulfills the preset second admission condition according to the timeslot occupancy ratio.

Specifically, in this embodiment, the following timeslot occupancy ratios can be obtained: the current timeslot occupancy ratio ($S_{all}$) of the system, the maximum timeslot occupancy ratio ($S_{max}$) of the system, and the timeslot occupancy ratio ($S_{new}$) required by the UE that needs to access the system. $S_{new}$ can be calculated out according to $R_{new}/D_{new}$; $R_{new}$ is an equivalent bandwidth of the data stream to be activated by the UE, and is 110 Kbps in this embodiment; and $D_{new}$ is the data rate of the DRC of the UE, and is 307.2 Kbps in this embodiment.

The current timeslot occupancy ratio of the communication system includes the timeslot occupancy ratios $SEF_1$, $SEF_2$, ..., $SEF_N$ corresponding to the Expedited Forwarding (EF) streams of activated non-dedicated line users, the timeslot occupancy ratios $SVIP_1$, $SVIP_2$, ..., $SVIP_K$ corresponding to the activated dedicated line users, and the timeslot occupancy ratio $S_{BCM}$ of broadcast streams, where N and K are positive integers.

In this embodiment, the formula for judging whether UE3 fulfills the preset second admission condition is $$S_{BCM} + \sum_{i=1}^{N} S_{EF,i} + \sum_{i=1}^{K} S_{VIP,i} + \frac{R_{new}}{D_{new}} < S_{EF,max}.$$

In this application scenario, the maximum occupancy ratio of the network is 30%, the timeslot occupancy ratio (Rnew/Dnew) of UE3 is 110/307.2, which is greater than 30%, and therefore, it is determined that UE3 does not fulfill the preset second admission condition, and the admission decision procedure proceeds to step D4.

D4. Obtain the timeslot utilization efficiency (L1) of UE3, and the minimum value (L2) of timeslot utilization efficiency among the UEs that have accessed the system.

In this embodiment, the timeslot utilization efficiency of the UE may be calculated according to the data rate requested by the UE from the system and the number of timeslots occupied by the UE. Specifically, the timeslot utilization efficiency (L1) of UE3 is 110/(35*5.12)=61%, where 5.12 Kbps is the maximum data rate of a single timeslot. In this application scenario, the minimum value of the timeslot utilization efficiency of the UEs that have accessed the system is the timeslot utilization efficiency of UE1; and the minimum value (L2) of the timeslot utilization efficiency is 110/(220*5.12)=9.7%. After the values of L1 and L2 are obtained, the admission decision procedure proceeds to step D5. It should be noted that L2 may also be the times lot utilization efficiency of another UE that has accessed the system.

In this embodiment, the timeslot utilization efficiency of the UE may also be calculated according to the data rate of the air interface DRC and the maximum data rate (3 Mbps) of the air interface DRC. For example, the timeslot utilization efficiency of UE1 is 307.2/3072=10%. Because the physical layer packet of the system is not full, the timeslot utilization efficiency of UE1 and UE2 which are calculated out according to the data rate of the air interface DRC and the maximum data rate of the air interface DRC is slightly greater than the timeslot utilization efficiency calculated out according to the data rate requested by the UE from the system and the number of timeslots occupied by the UE.

D5. Judge whether the difference between L1 and L2 is greater than a first decision threshold.

Specifically, the admission apparatus judges whether the difference between L1 and L2 is greater than the first decision threshold. In this application scenario, the first decision threshold is 40%; and, at this time, the difference between L1 and L2 is 51.3% which is greater than 40%, so step D6 begins.

D6. Allow UE3 to access the system.

In this embodiment, the access of UE2 in a low-quality wireless environment is denied, thus preventing UE2 from occupying excessive timeslot resources after the access; and UE3 in a high-quality wireless environment is allowed to access the system so that times lot resources are allocated to the UE in a high-quality wireless environment. Compared with the prior art, this embodiment prevents the problem that other users are unable to access the system because a few users occupy excessive resources. This embodiment improves the timeslot utilization efficiency, and fully uses the timeslot resources of the system.

Figure 5:
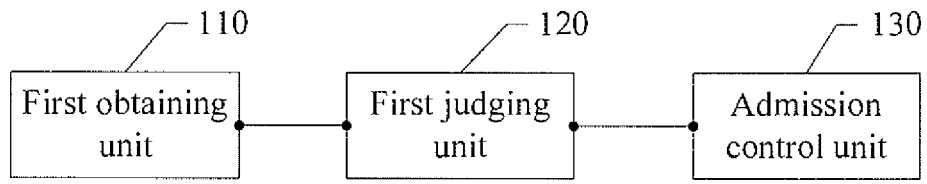
FIG. 5 shows a structure of an admission apparatus provided in the first embodiment of the present invention.

A corresponding admission apparatus is provided in an embodiment of the present invention. FIG. 5 shows a structure of an admission apparatus provided in the first embodiment of the present invention.

In this embodiment, the admission apparatus includes:

a first obtaining unit 110, configured to obtain timeslot utilization efficiency R1 of a first UE that needs to access a system and timeslot utilization efficiency R2 of a second UE that has accessed the system;

a first judging unit 120, configured to judge whether the difference between R1 and R2 is greater than a first decision threshold; and an admission control unit 130, configured to allow the first UE to access the system if the first judging unit 120 determines that the difference between R1 and R2 is greater than the first decision threshold.

In this embodiment, the first obtaining unit 110 can obtain the minimum value of the timeslot utilization efficiency of the UE that has accessed the system, namely, the second UE is the UE with the lowest timeslot utilization efficiency among the UEs that have accessed the system. The timeslot utilization efficiency (for example, R2) of the second UE may be the minimum value of the timeslot utilization efficiency of the UEs that have accessed the system.

The first embodiment of the admission apparatus may be applied in the first embodiment of the admission method above. The admission apparatus provided in this embodiment makes an admission decision according to whether the difference between the timeslot utilization efficiency of the first UE that needs to access the system and the timeslot utilization efficiency of the UE that has accessed the system is greater than the first decision threshold. Compared with the prior art, this embodiment enables the UE with high timeslot utilization efficiency to access the system, thus improving the timeslot utilization efficiency and the throughput of the system.

Figure 6:
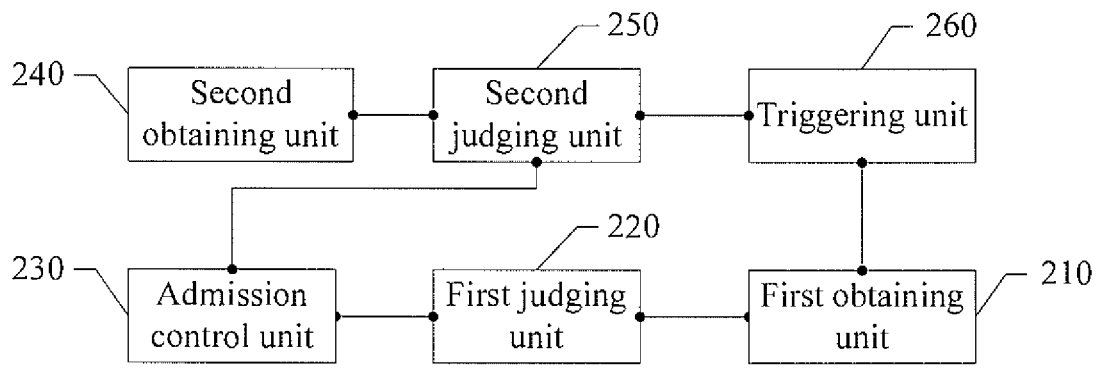
FIG. 6 shows a structure of an admission apparatus provided in the second embodiment of the present invention.

FIG. 6 shows a structure of an admission apparatus provided in the second embodiment of the present invention. The admission apparatus in this embodiment may include:

a first obtaining unit 210, configured to obtain timeslot utilization efficiency R1 of a first UE that needs to access a system and timeslot utilization efficiency R2 of a second UE that has accessed the system;

a first judging unit 220, configured to judge whether the difference between R1 and R2 is greater than a first decision threshold;

an admission control unit 230, configured to allow the first UE to access the system if the first judging unit 220 determines that the difference between R1 and R2 is greater than the first decision threshold;

a second obtaining unit 240, configured to obtain a current timeslot occupancy ratio $S_{all}$ of the system, a maximum timeslot occupancy ratio $S_{max}$ of the system, and a timeslot occupancy ratio $S_{new}$ required by the first UE that needs to access the system;

a second judging unit 250, configured to judge whether the sum of $S_{new}$ and $S_{all}$ is greater than $S_{max}$; and a triggering unit 260, configured to trigger the first obtaining unit 210 and the first judging unit 220 to make an admission decision for the first UE according to the timeslot utilization efficiency if the second judging unit 250 determines that the sum of $S_{new}$ and $S_{all}$ is greater than $S_{max}$, where the admission control unit 230 is further configured to allow the first UE to access the system if the second judging unit 250 determines that the sum of $S_{new}$ and $S_{all}$ is not greater than $S_{max}$.

It is understandable that as regards the relations between the units in the apparatus, the second obtaining unit 240 and the second judging unit 250 can work first, and then the triggering unit 260 judges whether to trigger the first obtaining unit 210 and the first judging unit 220 according to the judgment result of the second judging unit 250.

Specifically, the second embodiment of the admission apparatus may be applied in the second embodiment of the admission method above. In this embodiment, the admission apparatus makes the admission decision based on the timeslot occupancy ratio additionally. Therefore, when the system resources are enough, the first UE can access the system even if the timeslot utilization efficiency of the first UE is low. Besides, in this embodiment, the first UE can still access the system when the system resources are not enough but the timeslot utilization efficiency of the first UE is high, thereby avoiding the denial of the access of the UE whose timeslot utilization efficiency is high. Compared with the prior art, this embodiment enables the UE to access the system more flexibly, and enables the UE with high timeslot utilization efficiency to access the system, thus improving the timeslot utilization efficiency and the throughput of the system.

Figure 7:
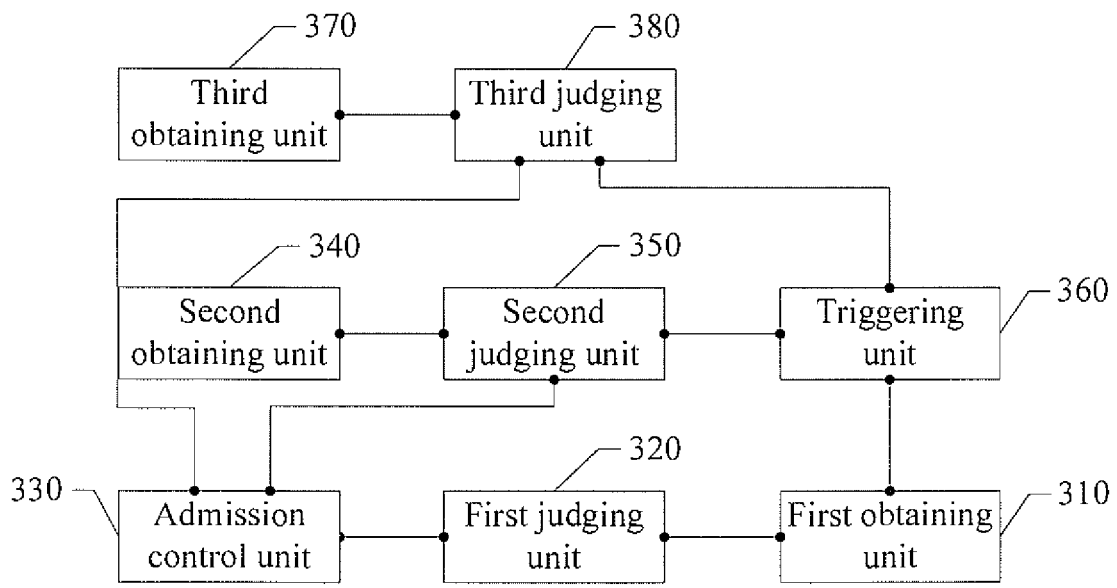
FIG. 7 shows a structure of an admission apparatus provided in the third embodiment of the present invention.

FIG. 7 shows a structure of an admission apparatus provided in the third embodiment of the present invention. Besides, the admission apparatus provided in this embodiment may include:

a first obtaining unit 310, configured to obtain timeslot utilization efficiency R1 of a first UE that needs to access a system and timeslot utilization efficiency R2 of a second UE that has accessed the system;

a first judging unit 320, configured to judge whether the difference between R1 and R2 is greater than a first decision threshold;

an admission control unit 330, configured to: allow the first UE to access the system if the first judging unit 320 determines that the difference between R1 and R2 is greater than the first decision threshold, or allow the first UE to access the system if the second judging unit 350 determines that the sum of $S_{new}$ and $S_{all}$ is not greater than $S_{max}$, or deny the access requested by the first UE if the third judging unit determines that the wireless quality parameter value does not fulfill the preset first admission condition;

a second obtaining unit 340, configured to obtain a current timeslot occupancy ratio $S_{all}$ of the system, a maximum timeslot occupancy ratio $S_{max}$ of the system, and a timeslot occupancy ratio $S_{new}$ required by the first UE that needs to access the system;

a second judging unit 350, configured to judge whether the sum of $S_{new}$ and $S_{all}$ is greater than $S_{max}$; and a triggering unit 360, configured to trigger the first obtaining unit 310 and the first judging unit 320 to make an admission decision for the first UE according to the timeslot utilization efficiency if the second judging unit 350 determines that the sum of $S_{new}$ and $S_{all}$ is greater than $S_{max}$, or trigger the second obtaining unit 340 and the second judging unit 350 to make an admission decision for the first UE according to the timeslot occupancy ratio if the third judging unit 380 determines that the wireless quality parameter value fulfills the preset first admission condition;

a third obtaining unit 370, configured to obtain a wireless quality parameter value of the first UE that needs to access the system; and a third judging unit 380, configured to judge whether the wireless quality parameter value fulfills a preset first admission condition.

The third embodiment of the admission apparatus may be applied in the third embodiment of the admission method above. In this embodiment, the admission apparatus makes the admission decision based on the wireless quality parameter of the first UE additionally, thus preventing the UE with low wireless quality from accessing the system, and preventing the UE from occupying excessive timeslot resources after the access. Therefore, this embodiment improves the resource utilization efficiency and the throughput of the system.

The admission apparatus provided in this embodiment may be a base station control device or a base station. Besides, the base station control device or base station in different communication systems correspond to different network devices. For example, in a GSM system, the base station control device is a Base Station Controller (BSC) and the base station is a Base Transceiver Station (BTS); in a WCDMA or TD-SCDMA system, the base station control device is a Radio Network Controller (RNC) and the base station is a NodeB; in an LTE system, an enhanced base station may make the admission decision; in a WiMAX system, the admission apparatus is a BTS.

A communication system is provided in an embodiment of the present invention. The communication system includes an admission apparatus. The structure of the admission apparatus is the same as the foregoing admission apparatus embodiment.

It should be noted that the information exchange between the units in the apparatus and system above and the implementation processes are based on the same conception as the method embodiment of the present invention, and are not described further.

After reading the foregoing embodiments, those skilled in the art are clearly aware that the present invention may be implemented through hardware, or through software in addition to a necessary universal hardware platform. The technical solution under the present invention may be embodied in a software product. The software product may be stored in a non-volatile storage medium (such as a Compact Disk-Read Only Memory (CD-ROM), a Universal Serial Bus (USB) flash disk, or a mobile hard disk), and may include several instructions that enable a computer device (such as a personal computer, a receiver, or a network device) to perform the methods provided in any embodiment of the present invention.

Detailed above are an admission method, an admission apparatus, and a communication system under the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. An admission method, comprising:
at an admission apparatus, making an admission decision according to timeslot utilization efficiency, wherein making the admission decision according to the timeslot utilization efficiency comprises:
obtaining timeslot utilization efficiency R1 of a first User Equipment (UE) that needs to access a system and timeslot utilization efficiency R2 of a second UE that has accessed the system;
judging whether a difference between R1 and R2 is greater than a first decision threshold; and
allowing the first UE to access the system if the difference between R1 and R2 is greater than the first decision threshold;
wherein obtaining the timeslot utilization efficiency R1 of the first UE that needs to access the system comprises:

calculating the timeslot utilization efficiency of the first UE according to a data rate of air interface data rate control (DRC) of the first UE and a maximum data rate of the air interface DRC.

2. The method according to claim 1, wherein the second UE is a UE with lowest time slot utilization efficiency among all UEs that have accessed the system.

3. An admission method, comprising:
at an admission apparatus, making an admission decision according to timeslot utilization efficiency, wherein making the admission decision according to the timeslot utilization efficiency comprises:
obtaining timeslot utilization efficiency R1 of a first User Equipment (UE) that needs to access a system and timeslot utilization efficiency R2 of a second UE that has accessed the system;
judging whether a difference between R1 and R2 is greater than a first decision threshold; and
allowing the first UE to access the system if the difference between R1 and R2 is greater than the first decision threshold; wherein
before making the admission decision according to the timeslot utilization efficiency, the method further comprises:
making the admission decision according to a timeslot occupancy ratio;
wherein making the admission decision according to the timeslot occupancy ratio comprises:
obtaining a current timeslot occupancy ratio $S_{all}$ of the system, a maximum timeslot occupancy ratio $S_{max}$ of the system, and a timeslot occupancy ratio $S_{new}$ required by the first UE that needs to access the system;
judging whether a sum of $S_{new}$ and $S_{all}$ is greater than $S_{max}$;
triggering making the admission decision according to the timeslot utilization efficiency when it is determined that the sum of $S_{new}$ and $S_{all}$ is greater than $S_{max}$; and
allowing the first UE to access the system if it is determined that the sum of $S_{new}$ and $S_{all}$ is not greater than $S_{max}$.

4. The method according to claim 3, wherein before making the admission decision according to the timeslot occupancy ratio, the method further comprises:
obtaining a wireless quality parameter value of the first UE that needs to access the system;
judging whether the wireless quality parameter value fulfills a preset first admission condition;
triggering making the admission decision according to the timeslot occupancy ratio if it is determined that the wireless quality parameter value fulfills the preset first admission condition; and
denying access requested by the first UE if it is determined that the wireless quality parameter value does not fulfill the preset first admission condition.

5. The method according to claim 4, wherein:
the wireless quality parameter value is a Data Rate Control (DRC) value D1; and
judging whether the wireless quality parameter value fulfills the preset first admission condition comprises:
judging whether D1 is greater than a preset DRC admission threshold.

6. The method according to claim 4, wherein:
the wireless quality parameter value is a Carrier-to-Interference Ratio (CIR) P1; and
judging whether the wireless quality parameter value fulfills the preset first admission condition comprises:
judging whether P1 is greater than a preset CIR admission threshold.

7. The method according to claim 4, wherein:
the wireless quality parameter value is a receiving level L1; and
judging whether the wireless quality parameter value fulfills the preset first admission condition comprises:
judging whether L1 is less than a preset receiving level threshold.

8. An admission method, comprising:
at an admission apparatus, making an admission decision according to timeslot utilization efficiency, wherein making the admission decision according to the timeslot utilization efficiency comprises:
obtaining timeslot utilization efficiency R1 of a first User Equipment (UE) that needs to access a system and timeslot utilization efficiency R2 of a second UE that has accessed the system;
judging whether a difference between R1 and R2 is greater than a first decision threshold; and
allowing the first UE to access the system if the difference between R1 and R2 is greater than the first decision threshold;
wherein obtaining the timeslot utilization efficiency R1 of the first UE that needs to access the system comprises:
calculating the timeslot utilization efficiency of the first UE according to a data rate requested by the first UE from the system and the number of timeslots occupied by the first UE.

9. An admission apparatus, comprising:
a first obtaining unit, configured to obtain timeslot utilization efficiency R1 of a first User Equipment (UE) that needs to access a system and timeslot utilization efficiency R2 of a UE that has accessed the system;
a first judging unit, configured to judge whether a difference between R1 and R2 is greater than a first decision threshold; and
an admission control unit, configured to allow the first UE to access the system if the first judging unit determines that the difference between R1 and R2 is greater than the first decision threshold;
wherein the first obtaining unit is further configured to:
calculate the timeslot utilization efficiency of the first UE according to a data rate requested by the first UE from the system and the number of timeslots occupied by the first UE, or
calculate the timeslot utilization efficiency of the first UE according to a data rate of air interface data rate control (DRC) of the first UE and a maximum data rate of the air interface DRC.

10. The admission apparatus according to claim 9, wherein the timeslot utilization efficiency R2 obtained by the first obtaining unit is a minimum value of timeslot utilization efficiency among UEs that have accessed the system.

11. An admission apparatus, comprising:
a first obtaining unit, configured to obtain timeslot utilization efficiency R1 of a first User Equipment (UE) that needs to access a system and timeslot utilization efficiency R2 of a UE that has accessed the system;
a first judging unit, configured to judge whether a difference between R1 and R2 is greater than a first decision threshold;

an admission control unit, configured to allow the first UE to access the system if the first judging unit determines that the difference between R1 and R2 is greater than the first decision threshold;

a second obtaining unit, configured to obtain a current timeslot occupancy ratio $S_{all}$ of the system, a maximum timeslot occupancy ratio $S_{max}$ of the system, and a timeslot occupancy ratio $S_{new}$ required by the first UE that needs to access the system;

a second judging unit, configured to judge whether a sum of $S_{new}$ and $S_{all}$ is greater than $S_{max}$; and a triggering unit, configured to trigger the first obtaining unit and the first judging unit to make an admission decision for the first UE according to the timeslot utilization efficiency if the second judging unit determines that the sum of $S_{new}$ and $S_{all}$ is greater than $S_{max}$;

wherein the admission control unit is configured to allow the first UE to access the system if the second judging unit determines that the sum of $S_{new}$ and $S_{all}$ is not greater than $S_{max}$.

12. The admission apparatus according to claim 11, further comprising:

a third obtaining unit, configured to obtain a wireless quality parameter value of the first UE that needs to access the system; and a third judging unit, configured to judge whether the wireless quality parameter value fulfills a preset first admission condition;

wherein the triggering unit is configured to trigger the second obtaining unit and the second judging unit to make an admission decision for the first UE according to the timeslot occupancy ratio if the third judging unit determines that the wireless quality parameter value fulfills the preset first admission condition; and wherein the admission control unit is configured to deny access requested by the first UE if the third judging unit determines that the wireless quality parameter value does not fulfill the preset first admission condition.

13. The admission apparatus according to claim 11, wherein:

the timeslot utilization efficiency R2 obtained by the first obtaining unit is a minimum value of timeslot utilization efficiency among UEs that have accessed the system.

14. The admission apparatus according to claim 12, wherein:

the timeslot utilization efficiency R2 obtained by the first obtaining unit is a minimum value of timeslot utilization efficiency among UEs that have accessed the system.

* * * * *